Nov. 18, 1930.  S. HIRSCH  1,781,923
SHUTTER FOR PHOTOGRAPHIC CAMERAS
Filed March 29, 1928
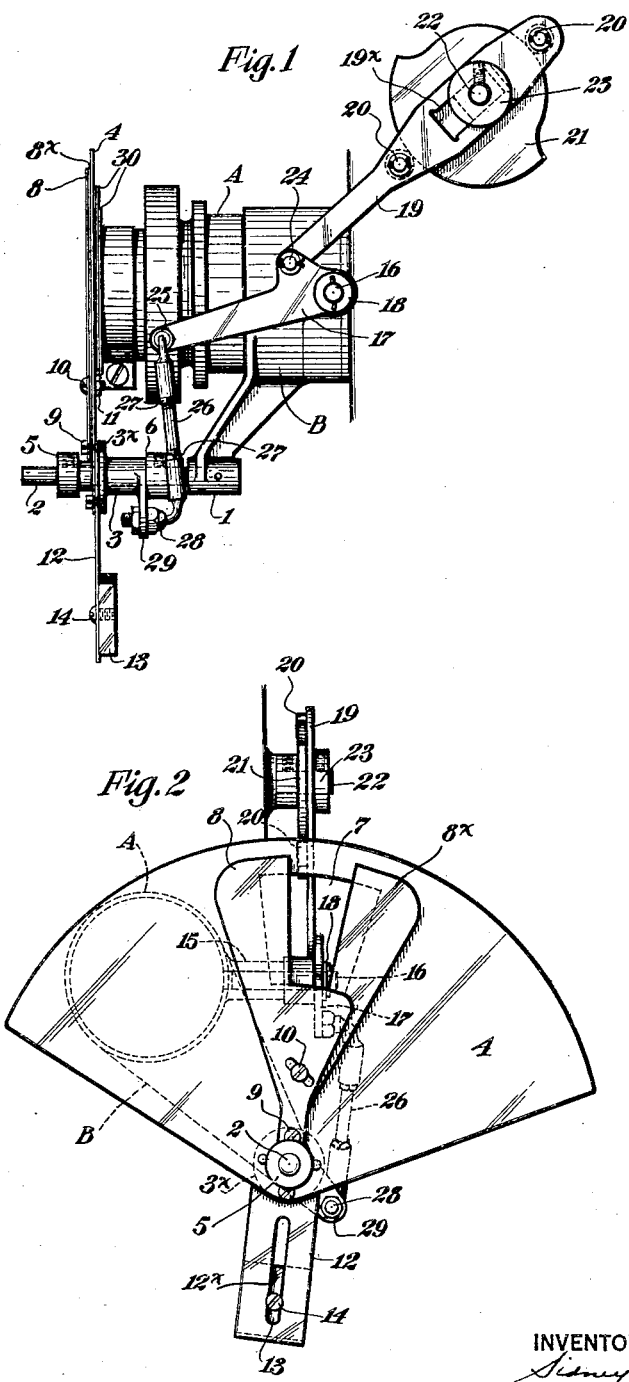
INVENTOR
Sidney Hirsch
BY
ATTORNEY Patented Nov. 18, 1930

1,781,923

UNITED STATES PATENT OFFICE

SIDNEY HIRSCH, OF NEW YORK, N. Y., ASSIGNOR TO PHOTOMATON INC., OF NEW YORK, N. Y., A CORPORATION OF NEW YORK

SHUTTER FOR PHOTOGRAPHIC CAMERAS

Application filed March 29, 1928. Serial No. 265,616.

The object of the present invention is to provide a shutter for photographic cameras in which the shutter is given an operative movement, the movement in each direction exposing and closing the lens, the shutter embodying means whereby the light aperture may be adjusted. The shutter is positively driven through operative connections with a cam or the like and is characterized by simplicity of construction and durability so as to be adapted for use in cameras acting upon reels of sensitized strip, in which durability and permanence of adjustment are necessary elements.

The invention will be described with reference to the accompanying drawing, in which—

Figure 1 is a side elevation of an embodiment of the invention, and

Figure 2 is a front elevation of the same.

In the drawings I have diagrammatically shown a lens mounting at A from which laterally projects a bracket B provided at its lower end with a boss 1, the latter carrying a fixed shaft 2. Mounted to oscillate upon shaft 2 is a sleeve 3 having an annular head 3× upon which is secured by screws or pins the primary fan-like shutter member 4. In front of the shutter member 4 and upon shaft 2 may be secured an abutment ring 5 and a second abutment ring 6 may be placed on the shaft rearwardly of sleeve 3.

The fan-like shutter member 4 is formed with an intermediate image aperture 7, in front of which are placed two adjusting wings 8, 8× pivoted at 9. Each adjusting wing is apertured to receive a set screw 10, the screw passing through primary shutter member 4 and having at its rear end a nut 11. By such means the adjusting wings may be securely clamped in adjusted position upon the primary shutter member. The annular head 3× of sleeve 3 may have secured thereto a depending arm 12 carrying a balance weight 13. The weight may be adjusted lengthwise relatively to arm 12, the arm being formed with a longitudinal slot 12×. A set screw 14 may be employed to secure the weight in its adjusted position.

Bracket B is formed with a horizontal extension 15 which is apertured to receive a shaft 16 on which is mounted a lever 17, the lever being held in place by a collar 18 on shaft 16. Lever 17 is driven by a reciprocatory cam arm 19, the latter being provided with oppositely placed contact studs 20 for engagement by a cam 21. Cam 21 is mounted upon a shaft 22 and the latter may be driven in any suitable manner. Shaft 22 passes through a longitudinal slot 19× formed in cam arm 19, and the cam arm is held in position through its contact at one face with the cam and through its contact at the opposite face with a collar 23 on shaft 22. Cam arm 19 is pivotally connected at 24 with lever 17. At 25 lever 17 is connected to a link 26 comprising upper and lower axially apertured threaded members and an intermediate member threaded in the apertures of the upper and lower members so that the length of the link may be adjusted and then held against movement by nuts 27. At its lower end link 26 is connected by a ball and socket connection 28 with a crank arm 29 projecting from sleeve 3. Connection 25 at the upper end of link 26 is, likewise, a ball and socket connection.

In the operation of the device, each rotation of shaft 22, will impart a reciprocatory movement to cam arm 19 through the action of cam 21. In turn an up and down movement will be given lever 17. From its position as shown in Figure 2 the primary shutter member 4 will move to the left until image aperture 7 comes into register with the lens mounting A, the primary shutter member continuing its movement to the left until the right hand portion of said member shields the lens. In a return stroke of cam arm 19 the image aperture 7 is again brought into register with the lens followed by a shielding of the lens by the left hand portion of the shutter, the members being brought to the position shown in Figure 2. If desired, one or a plurality of blades 30 may be placed on the primary shutter member 4 to balance or strengthen the same or act as members supplemental to the members 8, 8× for adjusting the size of the image aperture.

Having described my invention what I claim and desire to secure by Letters Patent is as follows:—

1. In shutters for photographic cameras, a primary shutter member formed with an intermediate image aperture and a lens shielding portion at each side of said aperture, a fan blade mounted on the shutter member for adjusting the size of the image aperture, a rotary shaft, a cam on the shaft, a cam arm, and lever and link connections intermediate the arm and the primary shutter member.

2. In shutters for photographic cameras, a fan-like blade formed with a central image aperture and with a shutter shielding portion at each side of said aperture, fan blades carried by said shutter member and adjustable to vary the size of the image aperture, a sleeve carrying the shutter member, a shaft for supporting said sleeve, a rotatable shaft, a cam on the shaft, a cam arm, a lever pivotally connected to the cam arm and a link operatively connecting the lever and the sleeve, substantially shown and described.

In testimony whereof, I have signed my name to this specification.

SIDNEY HIRSCH.